United States Patent
Syed et al.

(10) Patent No.: US 7,825,180 B2
(45) Date of Patent: Nov. 2, 2010

(54) THERMOPLASTIC BLEND COMPOSITIONS AS SOFT COUPLING AGENTS

(75) Inventors: Abuzar Syed, Torrington, CT (US); John M. Wefer, Newtown, CT (US)

(73) Assignee: Chemtura Corporation, Middlebury, CT (US)

( * ) Notice: Subject to any disclaimer, the term of this patent is extended or adjusted under 35 U.S.C. 154(b) by 505 days.

(21) Appl. No.: 11/542,045

(22) Filed: Oct. 2, 2006

(65) Prior Publication Data

US 2007/0093585 A1 Apr. 26, 2007

Related U.S. Application Data

(60) Provisional application No. 60/728,755, filed on Oct. 21, 2005.

(51) Int. Cl.
*C08K 3/30* (2006.01)
(52) U.S. Cl. .................. 524/425; 524/423; 524/493; 524/431; 524/445; 524/449; 524/494
(58) Field of Classification Search .................. 524/425
See application file for complete search history.

(56) References Cited

U.S. PATENT DOCUMENTS

| | | | |
|---|---|---|---|
| 3,414,551 A | 12/1968 | Reid et al. | |
| 4,812,526 A * | 3/1989 | Rifi | 525/240 |
| 5,376,701 A * | 12/1994 | Chow et al. | 523/213 |
| 6,235,840 B1 * | 5/2001 | Thiruvengada et al. | 525/71 |
| 6,579,944 B1 * | 6/2003 | Abdou-Sabet et al. | 525/191 |
| 6,894,227 B2 | 5/2005 | Kanamori et al. | |
| 7,041,741 B2 | 5/2006 | Patel et al. | |
| 2003/0100634 A1 * | 5/2003 | Heath et al. | 524/35 |
| 2004/0072924 A1 | 4/2004 | Sigworth et al. | |
| 2004/0214925 A1 | 10/2004 | Sigworth | |
| 2005/0137306 A1 | 6/2005 | Hausmann et al. | |
| 2005/0171263 A1 * | 8/2005 | Kanamori et al. | 524/430 |
| 2005/0222327 A1 | 10/2005 | Botros et al. | |

FOREIGN PATENT DOCUMENTS

| | | |
|---|---|---|
| EP | 0 519 341 B1 | 12/1991 |
| WO | WO2006019774 A1 | 2/2006 |
| WO | WO2007035506 A1 | 3/2007 |

* cited by examiner

*Primary Examiner*—Patrick Ryan
*Assistant Examiner*—Brent Thomas
(74) *Attorney, Agent, or Firm*—Joseph Suhadolnik

(57) ABSTRACT

A process for lowering the stiffness of filled thermoplastic polymer formulations is disclosed wherein the process comprises including in said formulation a low modulus coupling agent wherein said coupling agent comprises a blend of at least two functionalized polyolefins. Also disclosed is a process for producing soft coupling agents comprising blending at least two functionalized polyolefins in pre-determined ratios, whereby chemical and physical properties of the coupling agents can be controlled.

5 Claims, No Drawings

THERMOPLASTIC BLEND COMPOSITIONS AS SOFT COUPLING AGENTS

We claim the benefit under Title 35, United States Code, §120 of U.S. Provisional Application No. 60/728,755, filed Oct. 21, 2005, entitled THERMOPLASTIC BLEND COMPOSITIONS AS SOFT COUPLING AGENTS.

BACKGROUND OF THE INVENTION

1. Field of the Invention

The present invention is directed to coupling agents. More particularly, the present invention relates to blends of maleated polyolefins for use as coupling agents in polymeric matrices.

2. Description of Related Art

Performance requirements in automobile and other consumer industries are becoming more stringent owing to legislation, and products must be designed to meet those requirements. One example is a good flame retardant rating (V0) in both automobile and non-automobile industries. Products with improved performance conforming to set standards are not only necessary for the maintenance of existing business but are also essential in targeting new applications business growth. Thus, new product development often arises out of necessity.

Polymers comprising maleic anhydride grafted onto polypropylene (PP-g-MA) are widely used as coupling agents and compatibilizers in glass-filled polypropylene, talc-filled polypropylene, nylon/polypropylene blends, wood/plastic composites, and nano-composites in a large number of applications in automobiles and other consumer products. This has helped polypropylenes make an inroad into some very demanding automobile structural applications. These coupling agents are mostly based on homopolymer polypropylene where a high melting point along with high strength and stiffness properties are key requirements.

Polypropylene-g-MA is currently used as a coupling agent in polypropylene based wire harness for automobile applications and wire jackets for home appliance applications. Now, these applications are required to meet V0 flame retardant rating. Higher filler loadings are required to achieve this target, but polypropylene homopolymer-based products become stiffer and lose their flexibility when this is done. Random and impact polypropylene copolymers are being looked at as matrices for the development of these products. Polypropylene homopolymer-based PP-g-MA products are not appropriate for such applications, as they negatively affect the flexibility of the products.

The most common production method for polypropylene-g-MA products is via reactive extrusion using organic peroxide under controlled conditions. Owing to the high reaction temperature (above the melting point of polypropylene) requirements, the polypropylene chain undergoes scission along with reaction with maleic anhydride and a higher melt flow rate results. Further, the maleic anhydride content is generally low. Attempts to increase the maleic anhydride incorporation results in very high melt flow, as well as discoloration owing to polypropylene degradation and maleic anhydride oxidation. At some point, as the maleic anhydride is increased, the melt flow rate (MFR) can become so high (i.e., the molecular weight becomes very low) that the coupling agent tends to lose effectiveness.

As noted above, polypropylene impact or random copolymers can be used as the base material for maleic anhydride grafting to produce very low stiffness coupling agents. Unfortunately, at elevated reaction temperatures, any polyethylene segments of such copolymers often undergo cross-linking reactions along with the maleic anhydride grafting reaction, thereby producing a higher fraction of gel content. This results in a lower melt flow rate (MFR), which may inhibit dispersion of coupling agent in the final blend formulations.

A solid state grafting process is another production method for this type of product. Here, the reaction is carried out below the melting point of a precursor, such as a polypropylene homopolymer, random copolymer, impact copolymer, etc. The precursor degradation in this process is less than in reactive extrusion processes and, hence, the product MFR is more controllable. On the other hand, to minimize any cross-linking reaction, the reaction temperature is kept low, whereby the maleic anhydride incorporation is not very high. To compensate for this and achieve higher maleic anhydride incorporation, higher amounts of maleic anhydride and peroxide can be used, but then unreacted MA has to be removed. This method also results in an undesirably higher amount of free maleic anhydride in the product.

U.S. Pat. No. 3,414,551 discloses a process for reacting maleic anhydride with a crystalline polymer which comprises fluidizing the polymer in particulate form in contact with vapors of maleic anhydride and an organic peroxygen compound in an atmosphere of inert gas at a temperature of from about 80° C. up to a temperature about 10° below the melting point of the polymer in the absence of a solvent for the polymer for a time to cause chemical reaction of the polymer with from about 0.2 to 10% of maleic anhydride, based on the weight of the polymer.

EP 0 519 341 B 1 discloses a uniformly grafted particulate polyolefin material formed by the free radical-initiated grafting of at least one non-homopolymerizing vinyl monomer at free radical sites on a particulate olefin polymer material having (a) a pore volume fraction of at least about 0.07 wherein more than 40% of the pores have a diameter larger than 1 micron; and (b) a weight average diameter in the range of about 0.4 to 7 mm. The amount of vinyl monomer grafted to the as-polymerized particulate olefin polymer material is about 0.1 to 10%, preferably about 0.3 to 5.0%, of the total weight of the grafted olefin polymer product, and the grafted vinyl monomer is uniformly distributed throughout the particles of the olefin polymer material.

A need exists for the development of soft coupling agents having low flex modulus (e.g., 100-1000 MPA), high maleic anhydride content (greater than about 1%), and having an MFR high enough to allow ready dispersion in final compositions, but not so high as to lose effectiveness as a coupling agent. It is also evident that a need exists to enable independent control of maleic anhydride content and melt flow rate.

SUMMARY OF THE INVENTION

In considering the solution to the above-mentioned problem, the present inventors theorized that low modulus coupling agents would lower the stiffness of filled polyolefin formulations. They found that this improves the desired flexibility of parts while keeping the advantages of filler content. Examples of applications where this is advantageous are hoses and conduits where a combination of flexibility and abrasion resistance are desired. Other examples include, but are not limited to, flame-retardant polypropylene wire jackets and harnesses containing magnesium hydroxide.

The typical stiffness of commercially available homopolymer-based maleated products is typically about 1500-2000 Mpa, the MA contents are about 0.5-3% and the melt flow rates are about 3-1000 dg/min. In commercial products produced by reactive extrusion, the MFR tend to rise as the maleic anhydride content rises.

It has now been found that one can employ a blend approach to produce soft coupling agents where maleic anhydride level, softness (lower stiffness), and melt flow rates of the products can be independently controlled by varying ratios of readily available maleated components: in the present work, three different commercially available maleated components were used, off-the-shelf. The ingredients include Royltuf 498, a maleated EPDM (for softness), Polybond 3000, a maleated homo polypropylene-g-MA (for melt flow) and Polybond X5104, a maleated homo polypropylene-g-MA (for maleic anhydride content) (Table-1).

Specifically, it was found that by varying the blend ratios, then compounding, coupling agents could be produced having higher maleic anhydride content (about 1.2-1.7%), varying stiffness level (about 100-1500 Mpa), and MFR (about 1-100 dg/min) (Table-2).

More particularly, the present invention is directed to a process for lowering the stiffness of filled thermoplastic polymer formulations comprising including is said formulation a low modulus coupling agent wherein said coupling agent comprises a blend of at least two functionalized polyolefins. Preferably, the filled thermoplastics are filled polyolefins.

In another aspect, the present invention is directed to a process for producing soft coupling agents comprising blending at least two functionalized polyolefins in pre-determined ratios, whereby chemical and physical properties of the coupling agents can be controlled.

DESCRIPTION OF THE PREFERRED EMBODIMENT(S)

U.S. Pat. No. 7,041,741 discloses toughened thermoplastic compositions comprising a thermoplastic polymer toughened by the inclusion of a thermoplastic elastomer derived from a particulate rubber dynamically vulcanized in the presence of a matrix polymer. The toughened thermoplastic composition are said to exhibit properties including toughness, improved impact resistance, and improved hardness. The disclosure of U.S. Pat. No. 7,041,741 is incorporated herein by reference in its entirety.

The thermoplastic polymer components employed in the practice of the present invention include, but are not limited to, polyolefins, polyamides, polyesters, halogen-containing thermoplastics, such as polyvinylidene chloride, and copolymers of the foregoing. Blends of thermoplastic polymers can be used. Polyolefins are preferred.

The preferred polyolefins employed as the thermoplastic polymer components in the practice of the present invention are typically polymerized from ethylene, propylene, and/or other alpha olefins. Polymers of monoolefins and diolefins, for example polypropylene, polyisobutylene, polybutene-1, polymethylpentene-1, polyisoprene, or polybutadiene, as well as polymers of cycloolefins, for instance of cyclopentene or norbornene, polyethylene (which optionally can be crosslinked), for example high density polyethylene (HDPE), low density polyethylene (LDPE) and linear low density polyethylene (LLDPE) may be used. Mixtures of these polymers, for example, mixtures of polypropylene with polyisobutylene, polypropylene with polyethylene (for example PP/HDPE, PP/LDPE) and mixtures of different types of polyethylene (for example LDPE/HDPE), may also be used. Also useful are copolymers of monoolefins and diolefins with each other or with other vinyl monomers, such as, for example, ethylene/propylene, LLDPE and its mixtures with LDPE, propylene/butene-1, ethylene/hexene, ethylene/ethylpentene, ethylene/heptene, ethylene/octene, propylene/isobutylene, ethylene/butane-1, propylene/butadiene, isobutylene, isoprene, ethylene/alkyl acrylates, ethylene/alkyl methacrylates, ethylene/vinyl acetate (EVA) or ethylene/acrylic acid copolymers (EAA) and their salts (ionomers) and terpolymers of ethylene with propylene and a diene, such as hexadiene, dicyclopentadiene or ethylidene-norbornene; as well as mixtures of such copolymers and their mixtures with polymers mentioned above, for example polypropylene/ethylene propylene-copolymers, LDPE/EVA, LDPE/EAA, LLDPE/EVA, and LLDPE/EAA.

The olefin polymers may be produced by, for example, polymerization of olefins in the presence of Ziegler-Natta catalysts optionally on supports such as, for example, $MgCl_2$, chromium salts and complexes thereof, silica, silica-alumina and the like. The olefin polmers may also be produced utilizing chromium catalysts or single site catalysts, e.g., metallocene catalysts such as, for example, cyclopentadiene complexes of metals such as Ti and Zr. As one skilled in the art would readily appreciate, the polyethylene polymers used herein, e.g., LLDPE, can contain various comonomers such as, for example, 1-butene, 1-hexene and 1-octene comonomers.

The functionalized polyolefins employed as the coupling agents of the present invention, preferably a modified polyethylene or polypropylene, are those that contain groups that can interact with groups on species to be coupled. Such polymers are modified by a reactive group including at least one polar monomer selected from the group consisting of ethylenically unsaturated carboxylic acids or ethylenically unsaturated carboxylic acid anhydrides. Mixtures of the acids and anhydrides, as well as their derivatives, can also be used. Examples of the acids include maleic acid, fumaric acid, itaconic acid, crotonic acid, acrylic acid, methacrylic acid, maleic anhydride, itaconic anhydride, and substituted maleic anhydrides. Maleic anhydride is preferred. Derivatives that may also be used include salts, amides, imides, and esters. Examples of these include, glycidyl methacrylate, mono- and disodium maleate, and acrylamide. Preferably, such couplers comprise a polyolefin, such as a polyethylene or polypropylene, having a number average molecular weight (by GPC) that ranges from about 20,000 to about 400,000. Each polymer of the coupling agent can be modified from about 0.1 to about 800 residues per mole of the polymer. Preferred couplers comprise either a modified polypropylene or a modified polyethylene modified with maleic anhydride residues. The most preferred couplers are maleic anhydride modified polypropylenes, maleic anhydride modified EPDMs, and maleic anhydride modified high density polyethylenes. The preferred materials have a number average molecular weight (by GPC) that ranges from about 20,000 to about 300,000 and contain about 0.1 to about 3% maleic anhydride. In particular, one example of one of the functionalized polyolefins that can be employed in the practice of the present invention to control melt flow is Polybond 3000, a maleic anhydride functionalized polypropylene, available from Chemtura Corporation, that has a number average molecular weight of 25,000 and a maleic anhydride content of 1.5%. Functionalized polyolefin levels of from about 1 to about 25 weight percent based on the total formulation weight can be used with levels of from about 5 to about 20 weight percent being preferred.

Thus, the blend approach of the present invention produces soft coupling agents where the maleic anhydride level, softness (lower stiffness), and melt flow rates of the products can be independently controlled by varying ratios of commercially available maleated components. Other commercially available ingredients that can be used include Royltuf 498, a maleated EPDM (for softness) and Polybond X5104 and Polybond 3200, a maleated homo polypropylene-g-MA (for maleic anhydride content and flow properties) (See Table 1).

By varying the blend ratios followed by compounding, coupling agents having higher maleic anhydride content (~1.0-1.7%), varying stiffness level (200-1400 Mpa) and MFR (1-78 dg/min) (Table-2) have been produced.

TABLE 1

Characteristics of Useful Ingredients

| Ingredients | MA (%) | MFR (dg/min at 230° C., 2.16 kg) | Mooney viscosity (ML 1 + 4 @ 125° C.) |
|---|---|---|---|
| Polybond 3000 | 1.5 | 1000 | — |
| Polybond X5104 | 2.7 | 4 | — |
| Royaltuf 498 | 0.9 | — | 30 |
| Polybond 3200 | 1 | 255 | — |

TABLE 2

Blend Compositions and Product Properties

| | Sample Codes: | | | | | | | | | |
|---|---|---|---|---|---|---|---|---|---|---|
| | 1 | 2 | 3 | 4 | 5 | 6 | 7 | 8 | 9 | 10 |
| Blend Compositions | | | | | | | | | | |
| Polybond 3200 (%) | | | | | | | | | 50 | 65 |
| Polybond 3000 (%) | 0 | 0 | 0 | 32 | 27.25 | 22.5 | 54.5 | 45 | | |
| Polybond X5104 (%) | 36 | 45.5 | 55 | 36 | 45.5 | 55 | 45.5 | 55 | | |
| Royaltuf 498 (%) | 64 | 54.5 | 45 | 32 | 27.25 | 22.5 | 0 | 0 | 50 | 35 |
| Naugard B-25 (%) | 0.2 | 0.2 | 0.2 | 0.2 | 0.2 | 0.2 | 0.2 | 0.2 | 0.2 | 0.2 |
| Characterization | | | | | | | | | | |
| Flexural Str (MPa) | 5.2 | 7.72 | 11.95 | 22 | 26.3 | 29.2 | 44.67 | 45.1 | 10.9 | 19.7 |
| Flexural Mod (MPa) | 216.2 | 275 | 381.4 | 681.3 | 828.8 | 932.7 | 1392 | 1434.1 | 300 | 565 |
| MFR (230° C., 2.16 kg) | 0.97 | 1.13 | 1.63 | 12.67 | 11.15 | 9.3 | 77.9 | 46.8 | 17.2 | 55.6 |
| Maleic Anhydride (%) by titration | 1.208 | | | | 1.506 | 1.53 | | 1.706 | 1 | 1 |

Naugard B-25 is a 1:1 blend of phenolic and phosphite antioxidants, added for process stability.

The fillers that are included in the formulations of the present invention include, but are not limited to, calcium carbonate, talc, calcined kaolin, mica, feldspar, dolomite, wollastonite, silica, glass, calcium silicate, china clay, wood flour, barite, calcium sulfate, titanium dioxide, asbestos, rock flour, heavy spar, barium sulfate, metal oxides and hydroxides, carbon black, graphite, combinations thereof, and the like. The fillers can be used in amounts of at least one part by weight, for example, 5 to 200 parts by weight, expediently, 10 to 150 parts by weight, and, in particular, from 15 to 100 parts by weight, based on 100 parts by weight of thermoplastic polymer.

Thus, the thermoplastic resins stabilized by the phosphite blends of the present invention may optionally contain an additional stabilizer or mixture of stabilizers selected from the group consisting of the phenolic antioxidants, hindered amine stabilizers, the ultraviolet light absorbers, phosphites, phosphonites, alkaline metal salts of fatty acids, the hydrotalcites, metal oxides, epoxydized soybean oils, the hydroxylamines, the tertiary amine oxides, lactones, thermal reaction products of tertiary amine oxides, and the thiosynergists.

The filled thermoplastic polymeric formulations can, optionally, also contain various conventional additives, such as the following:

Antioxidants: Antioxidants may comprise alkylated monophenols, for example: 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4isobutylphenol, 2,6-dicyclopentyl-4-methylphenol, 2-(αmethylcyclohexyl)-4,6 dimethylphenol, 2,6-di-octadecyl-4-methylphenol, 2,4,6,-tricyclohexylphenol, 2,6-di-tert-butyl-4-methoxymethylphenol. Alkylated hydroquinones, for example, 2,6di-tert-butyl-4-methoxyphenol, 2,5-di-tert-butylhydroquinone, 2,5-di-tert-amyl-hydroquinone, 2,6 diphenyl-4-octadecyloxyphenol, may also be used as antioxidants.

Antioxidants used may also comprise hydroxylated thiodiphenyl ethers, for example, 2,2'-thio-bis-(6-tert-butyl-4-methylphenol), 2,2'-thio-bis-(4-octylphenol), 4,4'-thio-bis-(6-tertbutyl-3-methylphenol), and 4,4'-thio-bis-(6-tert-butyl-2-methylphenol).

Alkylidene-bisphenols may be used as antioxidants as, for example, 2,2'-methylene-bis-(6-tert-butyl-4-methylphenol), 2,2'-methylene-bis-(6-tert-butyl-4-ethylphenol), 2,2'-methylene-bis-(4-methyl-6-(α-methylcyclohexyl)phenol), 2,2'-methylene-bis-(4-methyl-6-cyclohexylphenol), 2,2'-methylene-bis-(6-nonyl-4-methylphenol), 2,2'-methylene-bis-(6-nonyl-4-methylphenol), 2,2'-methylene-bis-(6-(α-methylbenzyl)-4-nonylphenol), 2,2'-methylene-bis-(6-(α, αdimethylbenzyl)-4-nonyl-phenol). 2,2'-methylene-bis-(4, 6-di-tert-butylphenol), 2,2'-ethylidene-bis-(6-tert-butyl-4-isobutylphenol), 4,4'methylene-bis-(2,6-di-tert-butylphenol), 4,4'-methylene-bis-(6-tert-butyl-2-methylphenol), 1,1-bis-(5-tert-butyl-4-hydroxy-2-methylphenol)butane, 2,6-di-(3-tert-butyl-5-methyl-2-hydroxybenzyl)-4-methylphenol, 1,1,3-tris-(5-tert-butyl-4-hydroxy-2-methylphenyl)butane, 1,1-bis-(5-tert-butyl-4-hydroxy2-methylphenyl)-3-dodecyl-mercaptobutane, ethyleneglycol-bis-(3,3-bis-(3'-tert-butyl-4'-hydroxyphenyl)-butyrate)-di-(3-tert-butyl-4-hydroxy-5-methylpenyl)-dicyclopentadiene, di-(2-(3'-tert-butyl-2'-hydroxy-5'-methylbenzyl)-6-tert-butyl-4-methylphenyl)terephthalate, and other phenolics, such as monoacrylate esters of bisphenols, such as ethylidiene bis-2,4-di-t-butylphenol monoacrylate ester and esters of 3-5 di-butyl hydroxyphenyl propionic acid. The phenolic antioxidants of particular interest are selected from the group consisting of n-octadecyl 3,5-di-tert-butyl-4-hydroxyhydrocinnamate, neopentanetetrayl tetrakis(3,5-di-tert-butyl-4-hydroxyhydrocinnamate), di-n-octadecyl 3,5-di-tert-butyl-4-hydroxybenzylphosphonate, 1,3,5-tris(3,5-di-tert-butyl-4-hydroxybenzyl)-isocyanurate, thiodiethylene bis (3,5-di-tert-butyl-4-hydroxyhydrocinnamate), 1,3,5-trimethyl-2,4,6-tris(3,5-di-tert-butyl-4-hydroxybenzyl) benzene, 3,6-dioxaoctamethylene bis(3-methyl-5-tert-butyl-4-hydroxyhydrocinnamate), 2,6-di-tert-butyl-p-cresol, 2,2'-ethylidene-bis(4,6-di-tert-butylphenol), 1,3,5-tris(2,6-dimethyl-4-tert-butyl-3-hydroxybenzyl)isocyanurate, 1,1,3-tris(2-methyl-4-hydroxy-5-tert-butylphenyl)butane, 1,3,5-tris[2-(3,5-di-tert-butyl-4-hydroxyhydrocinnamoyloxy) ethyl]isocyanurate, 3,5-di-(3,5-di-tert-butyl-4-hydroxybenzyl)mesitol, hexamethylene bis(3,5-di-tert-butyl-4-hyroxyhydrocinnamate), 1-(3,5-di-tert-butyl4-hydroxyanilino)-3,5-di(octylthio)-s-triazine, N,N'-hexamethylene-bis(3,5-di-tert-butyl-4-hydroxyhydrocinnamamide), calcium bis(ethyl 3,5-di-tert-butyl-4-hydroxybenzylphosphonate), ethylene bis[3,3-di(3-tert-butyl-4-hydroxyphenyl)butyrate], octyl 3,5-di-tert-butyl-4-hydroxybenzylmercaptoacetate, bis(3,5-di-tert-butyl-4-hydroxyhydrocinnamoyl)hydrazide, and N,N'-bis-[2-(3,5-di-tert-butyl-4-hydroxyhydrocinnamoyloxy)ethyl]-oxamide.

Other antioxidants that may be used include benzyl compounds, for example, 1,3,5-tris-(3,5-di-tert-butyl-4-hydroxybenzyl)-2,4,6-trimethylbenzene, bis-(3,5-di-tert-butyl-4-hydroxybenzyl)sulfide, isooctyl 3,5-di-tert-butyl-4-hydroxybenzyl-mercaptoacetate, bis-(4-tert-butyl-3-hydroxy-2,6-dimethylbenzyl)dithiol-terephthalate, 1,3,5-tris-(3,5-di-tert-butyl-4,10 hydroxybenzyl)isocyanurate, 1,3,5-tris-(4-tert-butyl-3-hydroxy-2,6-dimethylbenzyl) isocyanurate, dioctadecyl 3,5-di-tert-butyl-4-hydroxybenzylphosphonate, calcium salt of monoethyl 3,5-di-tertbutyl-4-hydroxybenzylphosphonate, and 1,3,5-tris-(3,5-dicyclohexyl-4-hydroxybenzyl)isocyanurate.

Acylaminophenols may be used as antioxidants, for example, 4-hydroxy-lauric acid anilide, 4-hydroxy-stearic acid anilide, 2,4-bis-octylmercapto-6-(3,5-tert-butyl-4-hydroxyanilino)-s-triazine, and octyl-N-(3,5-di-tert-butyl-4-hydroxyphenyl)-carbamate.

Esters of β-(5-tert-butyl-4-hydroxy-3-methylphenyl)-propionic acid with monohydric or polyhydric alcohols, for example, methanol, diethyleneglycol, octadecanol, triethyleneglycol, 1,6-hexanediol, pentaerythritol, neopentylglycol, tris-hydroxyethyl isocyanurate, thiodiethyleneglycol, and dihydroxyethyl oxalic acid diamide may also be used as antioxidants.

Antioxidants may also comprise amides of β-(3,5-di-tert-butyl-4hydroxyphenol)-propionic acid, for example, N,N'-di-(3,5-di-tert-butyl-4-hydroxyphenylpropionyl)-hexamethylenediamine, N,N'-di-(3,5-di-tert-butyl-4-hydroxyphenylpropionyl)trimethylenediamine, and N,N'-di (3,5-di-tert-butyl-4-hydroxyphenylpropionyl)-hydrazine.

UV absorbers and light stabilizers may comprise 2-(2'-hydroxyphenyl)-benzotriazoles, for example, the 5'-methyl-, 3'5'-di-tert-butyl-,5'-tert-butyl-,5'(1,1,3,3-tetramethylbutyl)-, 5-chloro-3',5'-di-tert-butyl-,5-chloro-3'-tert-butyl-5'-methyl-3'-sec-butyl-5'-tert-butyl-,4'-octoxy, 3',5'-di-tert-amyl-3',5'-bis-(α,α-dimethylbenzyl)-derivatives. 2-Hydroxy-benzophenones, for example, the 4-hydroxy-4-methoxy-, 4-octoxy, 4-decyloxy-, 4-dodecyloxy-, 4-benzyloxy, 4,2',4'-trihydroxy- and 2'-hydroxy-4,4'-dimethoxy derivatives may also be used as UV absorbers and light stabilizers. UV absorbers and light stabilizers may also comprise esters of substituted and unsubstituted benzoic acids, for example, phenyl salicylate, 4-tert-butylphenyl salicylate, octylphenyl salicylate, dibenzoylresorcinol, bis-(4-tert-butylbenzoyl)-resorcinol, benzoylresorcinol, 2,4-di-tert-butyl-phenyl-3,5-di-tert-butyl-4-hydroxybenzoate, and hexadecyl-3,5-di-tert-butyl-4-hydroxybenzoate.

Acrylates, for example, α-cyano-β,β-diphenylacrylic acid-ethyl ester or isooctyl ester, α-carbomethoxy-cinnamic acid methyl ester, α-cyano-β-methyl-p-methoxy-cinnamic acid methyl ester or butyl ester, α-carbomethoxy-p-methoxy-cinnamic acid methyl ester, and N-(β-carbomethoxy-β-cyano-vinyl)-2-methyl-indoline may be used as UV absorbers and light stabilizers.

Other examples for UV absorbers and light stabilizers include nickel compounds, for example, nickel complexes of 2,2'-thio-bis(4-(1,1,1,3-tetramethylbutyl)-phenol), such as the 1:1 or 1:2 complex, optionally with additional ligands such as n-butylamine, triethanolamine or N-cyclohexyl-diethanolamine, nickel dibutyldithiocarbamate, nickel salts of 4-hydroxy-3,5-di-tert-butylbenzylphosphonic acid monoalkyl esters, such as of the methyl, ethyl, or butyl ester, nickel complexes of ketoximes such as of 2-hydroxy-4-methyl-penyl undecyl ketoxime, nickel complexes of 1-phenyl-4-lauroyl-5-hydroxy-pyrazole, optionally with additional ligands.

Sterically hindered amines may be used as UV absorbers and light stabilizers as for example bis (2,2,6,6-tetramethylpiperidyl)-sebacate, bis-5 (1,2,2,6,6-pentamethylpiperidyl)-sebacate, n-butyl-3,5-di-tert-butyl-4-hydroxybenzyl malonic acid bis(1,2,2,6,6,-pentamethylpiperidyl)ester, condensation product of 1-hydroxyethyl-2,2,6,6-tetramethyl-4-hydroxy-piperidine and succinic acid, condensation product of N,N'-(2,2,6,6-tetramethylpiperidyl)-hexamethylenediamine and 4-tert-octylamino-2,6-dichloro-1,3,5-s-triazine, tris-(2,2,6,6-tetramethylpiperidyl)-nitrilotriacetate, tetrakis-(2,2,6,6-tetramethyl-4-piperidyl)-2,3,4-butane-tetra-carbonic acid, 1,1'(1,2-ethanediyl)-bis-(3,3,5,5-tetramethylpiperazinone). These amines, typically called HALS (Hindered Amine Light Stabilizers), include butane tetracarboxylic acid 2,2,6,6-tetramethyl piperidinol esters. Such amines include hydroxylamines derived from hindered amines, such as di(1-hydroxy-2,2,6,6-tetramethylpiperidin-4-yl) sebacate; 1-hydroxy-2,2,6,6-tetramethyl-4-benzoxypiperidine; 1-hydroxy-2,2,6,6-tetramethyl-4-(3,5-di-tert-butyl-4-hydroxy hydrocinnamoyloxy)-piperidine; and N-(1-hydroxy-2,2,6,6-tetramethyl-piperidin-4-yl)-epsiloncaprolactam.

UV absorbers and light stabilizers may also comprise oxalic acid diamides, for example, 4,4'-di-octyloxy-oxanilide, 2,2'-di-octyloxy-5',5'-di-tert-butyloxanilide, 2,2'-didodecyloxy-5',5'di-tert-butyl-oxanilide, 2-ethoxy-2'-ethyloxanilide, N,N'-bis(3-dimethylaminopropyl)-oxalamide, 2-ethoxy-5-tert-butyl-2'-ethyloxanilide and its mixture with 2-ethoxy-2'-ethyl-5,4-di-tert-butyloxanilide and mixtures of ortho- and para-methoxy-, as well as of o- and p-ethoxy-, disubstituted oxanilides.

UV absorbers and light stabilizers also include hydroxyphenyl-s-triazines, as, for example, 2,6-bis-(2,4-dimethylphenyl)-4-(2-hydroxy-4-octyloxyphenyl)-s-triazine, 2,6-bis(2,4-dimethylphenyl)-4-(2,4-dihydroxyphenyl)-s-triazine; 2,4-bis(2,4-dihydroxyphenyl)-6-(4-chlorophenyl)-s-triazine; 2,4-bis(2-hydroxy-4-(2-hydroxyethoxy)phenyl)-6-(4-chlorophenyl)-s-triazine; 2,4-bis(2-hydroxy-4-(2-hydroxyethoxy)phenyl)-6-phenyl-s-triazine; 2,4-bis(2-hydroxy-4-(2-hydroxyethoxy)-phenyl)-6-(2,4-dimethylphenyl)-s-triazine; 2,4-bis(2-hydroxy-4-(2- hydroxyethoxy)phenyl)-6-(4-bromo-phenyl)-s-triazine; 2,4-bis(2-hydroxy-4-(2-acetoryethoxy)phenyl)-6-(4-chlorophenyl)-s-triazine, 2,4-bis(2,4-dihydroxyphenyl)-6-(2,4-dimethylphenyl)-1-s-triazine.

Metal deactivators as, for example, N,N'-diphenyloxalic acid diamide, N-salicylal-N'-salicyloylhydrazine, N,N'-bis-salicyloylhydrazine, N,N'-bis-(3,5-di-tert-butyl-4-hydrophenylpropionyl)-2-hydrazine, salicyloylamino-1,2,4-triazole, and bis-benzyliden-oxalic acid dihydrazide, may also be used.

Phosphites and phosphonites, as, for example, triphenyl phosphite, diphenylalkyl phosphites, phenyldialkyl phosphites, tris(nonyl-phenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, 2,4,6-tri-tert-butylphenyl-2-butyl-2-ethyl-1,3-propanediol phosphite, bis(2,4-di-tert-butylphenyl)pentaerythritol diphosphite, bis(2,4-di-cumyl)pentaerythritol diphosphite, tristearyl sorbitol triphosphite, and tetrakis(2,4-di-tert-butylphenyl)4,4'-biphenylene diphosphonite may be used in some embodiments of the invention in addition to the phosphites of the invention.

Peroxide scavengers, as, for example, esters of beta-thiodipropionic acid, for example the lauryl, stearyl, myristyl or tridecyl esters, mercaptobenzimidazole or the zinc salt of 2-mercaptobenzimidazole, zinc-dibutyldithiocarbamate, dioctadecyldisulfide, and pentaerythrotetrakis-(β-dodecylmercapto)-propionate may be used.

Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecyl hydroxylamine, N-heptadecyl-N-octadecylhydroxylamine, and N,N-dialkylhydroxylamine derived from hydrogenated tallow amine may also be used in some embodiments of the present invention.

Nitrones, for example, N-benzyl-α-phenyl nitrone, N-ethyl-α-methyl nitrone, N-octyl-α-heptyl nitrone, N-lauryl-α-undecyl nitrone, N-tetradecyl-α-tridecyl nitrone, N-hexadecyl-α-pentadecyl nitrone, N-octadecyl-α-heptadecylnitrone, N-hexadecyl-α-heptadecylnitrone, N-octadecyl-α-pentadecyl nitrone, N-heptadecyl-α-heptadecyl nitrone, N-octadecyl-α-hexadecyl nitrone, and nitrone derived from N,N-dialkylhydroxylamine derived from hydrogenated tallow amine may also be used.

Polyamide stabilizers, for example, copper salts in combination with iodides and/or phosphorus compounds and salts of divalent manganese.

Basic co-stabilizers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example, Ca stearate, calcium stearoyl lactate, calcium lactate, Zn stearate, Mg stearate, for example, Na ricinoleate and K palmitate, antimony pyrocatecholate or zinc pyrocatecholate, including neutralizers, such as hydrotalcites and synthetic hydrotalcites, and Li, Na, Mg, Ca, and Al hydroxy carbonates may be used in other embodiments of the present invention, as, also, MgZn hydroxycarbonates, MgAl hydroxycarbonates and AlZn hydroxycarbonates, and metal oxides, such as ZnO, MgO, and CaO.

Nucleating agents, for example, 4-tert-butylbenzoic acid, adipic acid, diphenylacetic acid, sodium salt of methylene bis-2,4-dibutylphenyl, cyclic phosphate esters, sorbitol tris-benzaldehyde acetal, and the sodium salt of bis(2,4-di-t-butylphenyl) phosphate or the Na salt of ethylidene bis(2,4-di-t-butyl phenyl)phosphate may also be used in some embodiments.

Other additives may be, for example, plasticizers, epoxidized vegetable oils, such as epoxidized soybean oils, lubricants, emulsifiers, pigments, optical brighteners, flameproofing agents, anti-static agents, blowing agents and thiosynergists, such as dilaurythiodipropionate or distearylthiodipropionate, and the like.

The additives and stabilizers described herein are preferably present in an amount effective to improve composition stability. When one of the aforementioned additives and stabilizers is utilized, the amount is generally less than about 5 weight percent based on the weight of the resin and is preferably at least about 50 ppm based on the weight of the resin.

The various formulation components employed in the practice of the present invention may readily be incorporated into the thermoplastic resin by conventional techniques, at any convenient stage prior to the manufacture of shaped articles therefrom. For example, they may be mixed with the resin in dry powder form, or a suspension or emulsion of the filler or additive may be mixed with a solution, suspension, or emulsion of the polymer. Thus, the formulations of the invention may, in addition to the fillers described, optionally also contain from about 0.001 to about 5%, preferably from about 0.0025 to about 2%, and especially from about 0.005% to about 1%, by weight of various conventional additives, such as those described above, or mixtures thereof.

The compositions of the present invention can be prepared by a variety of methods, such as those involving intimate admixing of the ingredients with any additional materials desired in the formulation. Suitable procedures include solution blending and melt blending. Because of the availability of melt blending equipment in commercial polymer processing facilities, melt processing procedures are generally preferred. Examples of equipment used in such melt compounding methods include: co-rotating and counter-rotating extruders, single screw extruders, disc-pack processors and various other types of extrusion equipment. In some instances, the compounded material exits the extruder through small exit holes in a die, and the resulting strands of molten resin are cooled by passing the strands through a water bath. The cooled strands can be chopped into small pellets for packaging and further handling.

All of the ingredients may be added initially to the processing system, or else certain additives may be pre-compounded with each other or with a portion of the polymeric resin to make a stabilizer concentrate. Moreover, it is also sometimes advantageous to employ at least one vent port to allow venting (either atmospheric or vacuum) of the melt. Those of ordinary skill in the art will be able to adjust blending times and temperatures, as well as component addition location and sequence, without undue additional experimentation.

Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner.

EXAMPLES

Coupling Agent Development

The coupling agents of the present invention (Inv-1, Inv-2, and Inv-3) were produced on a 30 mm twin screw ZSK extruder at 170-200° C. at 200 RPM and were used as coupling agents in 30% talc-filled polyolefin formulations. The characterization data and the selected mechanical properties of these coupling agents are tabulated in the following and compared to Polybond 3200 (Maleated polypropylene homopolymer from Chemtura) used a control. The coupling agents of this invention have lower flexural modulus and slightly higher MA functionality than the control.

TABLE 3

|  | Inv-1 | Inv-2 | Inv-3 | Polybond 3200 |
|---|---|---|---|---|
| Blend Compositions: | | | | |
| Polybond 3000 (%) | 29 | 27.25 | 25 | |
| Polybond X5104 (%) | 36 | 45.5 | 55 | |
| Royaltuf 498 (%) | 35 | 27.25 | 20 | |
| Total (%) | 100 | 100 | 100 | |
| Mechanical Properties: | | | | |
| Flexural Strength (MPa) | 18.75 | 23.35 | 28.55 | 42.58 |
| Flexural Modulus (MPa) | 595.5 | 757.6 | 956.2 | 1296 |
| Reversed Notched Izod (ftlb/in) | 17.8 (NB) | 18.5 (NB) | 22.6 (NB) | |
| MFR (230° C., 2.16 Kg) | 10.3 | 11.6 | 10.4 | 250 |
| MA (%) by titration | 1.3 | 1.3 | 1.4 | 1.2 |

EPDM) is dispersed in a thermoplastic matrix (typically polypropylene) and vulcanized during melt compounding." The talc used was Cimpact CB7 from Luzenac. The coupling agents were used at 5, 10, and 15% in the formulations. The compounding was done on a 30 mm twin screw ZSK extruder at 190°-200° C., 200 RPM. The extruded samples were dried at 100° C. for four hours prior to molding. The samples were tested for Notched Izod, reversed notched Izod impact, tensile and flexural properties by standard ASTM methods.

Talc Filled Impact Copolymer Formulations

When 10 and 15% loadings of the coupling agents of the present invention were used in the formulations, the flexural moduli were lowered by 5-17% and tensile moduli by 10-14%. The notched Izod results were improved by 40-80% and reversed notched Izod results were improved by 60-110%. The tensile elongation improved by more than 50%. At a 5% loading of the coupling agents, the stiffness of the filled formulations due to the difference in stiffness of coupling agents did not change. Only slight improvement in the impact properties and tensile elongation was observed. The properties are tabulated in Table 4.

TABLE 4

| | Impact PP Copolymer/30% Talc with Coupling Agent | | | | | |
|---|---|---|---|---|---|---|
| % Coupling | Tensile Modulus (kpsi) | | | Flex Modulus (kpsi) | | |
| Agent | Control | INV-1 | INV-2 | Control | INV-1 | INV-2 |
| 0 | 251 | 251 | 251 | 194 | 194 | 194 |
| 5 | 272.5 | 271.2 | 278.4 | 211.4 | 210.7 | 218 |
| 10 | NA | 272.8 | 277.5 | 247 | 204.6 | 216.7 |
| 15 | 326.7 | 280.5 | 286.6 | 246.6 | 223 | 233.1 |

TABLE 5

| | Impact PP Copolymer/30% Talc with Coupling Agent | | | | | | | | |
|---|---|---|---|---|---|---|---|---|---|
| % Coupling | Notched Izod Impact (ftlb/in) | | | Reversed Notched Izod Impact (ftlb/in) | | | Tensile Elongation (in) | | |
| Agent | Control | INV-1 | INV-2 | Control | INV-1 | INV-2 | Control | INV-1 | INV-2 |
| 0 | 0.84 | 0.84 | 0.84 | 9.1 | 9.1 | 9.1 | 0.6 | 0.6 | 0.6 |
| 5 | 0.75 | 0.91 | 0.9 | 7.5 | 8.1 | 9.6 | 0.475 | 0.511 | 0.546 |
| 10 | 0.66 | 1.01 | 0.97 | 3.6 | 7.6 | 8.7 | NA | 0.581 | 0.567 |
| 15 | 0.6 | 1.11 | 0.99 | 5.5 | 11.2 | 9 | 0.356 | 0.568 | 0.593 |

Application Testing

The improvement in flexibility of the filled compounds can be correlated to the lowering of flex and tensile modulus and the increase in impact and tensile elongation properties of the final compounds. Homopolymer based coupling agents, such as Polybond 3200, increase the stiffness (reduce the flexibility) of the filled compounds. Thus, the products of this invention (Inv-1 and Inv-2) and a control (Polybond 3200) were evaluated in 30% talc-filled impact polypropylene, Hifax KA 805A from Basell, and in a thermoplastic vulcanizate elastomer (TPV), Uniprene 7100, (shore A hardness 87 from Teknor Apex) to examine their effect on the stiffness of the filled compounds. According to the manufacturer, "TPVs are two-phase systems in which a thermoset rubber (most often

Talc Filled TPV Formulations

The coupling agents of this invention (Inv-1 and inv-2) were also tested in 30% talc filled TPV formulations at 5, 10, and 15% loadings to examine the effect on the flexibility (lowering of stiffness) of the compounds. Again, the coupling agents did not change the tensile and flexural moduli of the compounds at 5%. However, a reduction of 14-35% in flex modulus and 35-50% in tensile modulus, an increase 15-30% in notched Izod impact and 40-90% in tensile elongation was observed at 10 and 15% use levels as compared to that of the control (Polybond 3200). The data are shown in Tables 6 and 7.

TABLE 6

TPV (Uniprene 7100, Shore A Hardness 87)/30%
Talc with Coupling Agent

| % Coupling Agent | Tensile Modulus (kpsi) | | | Flex Modulus (kpsi) | | |
|---|---|---|---|---|---|---|
| | Control | INV-1 | INV-2 | Control | INV-1 | INV-2 |
| 0 | 29 | 29 | 29 | 20 | 20 | 20 |
| 5 | 63.1 | 66.7 | 48.33 | 37.1 | 38.9 | 39.7 |
| 10 | 83.8 | 43.88 | 52.7 | 50.7 | 40.4 | 43.3 |
| 15 | 114.6 | 54.7 | 60.5 | 75.7 | 49 | 58.8 |

TABLE 7

TPV (Uniprene 7100 Shore A Hardness 87)/30%
Talc with Coupling Agent

| % Coupling Agent | Notched Izod Impact (ftlb/in) | | | Tensile Elongation (in) | | |
|---|---|---|---|---|---|---|
| | Control | INV-1 | INV-2 | Control | INV-1 | INV-2 |
| 0 | 5.1 | 5.1 | 5.1 | 5.7 | 5.7 | 5.7 |
| 5 | 4.84 | 5.7 | 5.8 | 2.37 | 2.12 | 2.95 |
| 10 | 4.44 | 5.26 | 5.3 | 1.9 | 2.76 | 2.69 |
| 15 | 3.7 | 4.9 | 4.96 | 1.48 | 2.55 | 2.81 |

In view of the many changes and modifications that can be made without departing from principles underlying the invention, reference should be made to the appended claims for an understanding of the scope of the protection to be afforded the invention.

What is claimed is:

1. A process for lowering the stiffness of filled thermoplastic polymer formulations comprising including in said formulation from about 10 weight percent to about 15 weight percent of a low modulus coupling agent wherein said coupling agent comprises a blend of a maleic anhydride functionalized polypropylene, a maleated ethylene propylene diene, and a maleated homo polypropylene-g-MA.

2. The process of claim 1 wherein the low modulus coupling agent has a flexural modulus ranging from 100 MPa to 1500 MPa.

3. The process of claim 1 wherein the filled thermoplastic polymer is a filled polyolefin.

4. The process of claim 1 wherein the filler of the filled thermoplastic polymer is selected from the group consisting of calcium carbonate, talc, calcined kaolin, mica, feldspar, dolomite, wollastonite, silica, glass, calcium silicate, china clay, wood flour, barite, calcium sulfate, titanium dioxide, asbestos, rock flour, heavy spar, barium sulfate, metal oxides and hydroxides, carbon black, graphite, and combinations thereof.

5. The process of claim 4 wherein the filler is talc.

* * * * *